United States Patent [19]

Nelson

[11] Patent Number: 4,844,411
[45] Date of Patent: Jul. 4, 1989

[54] VALVE

[75] Inventor: Donald R. Nelson, Worcester, Mass.

[73] Assignee: Goddard Industries, Inc., Worcester, Mass.

[21] Appl. No.: 167,734

[22] Filed: Mar. 14, 1988

[51] Int. Cl.$^4$ ............................................. F16K 41/04
[52] U.S. Cl. ..................................... 251/214; 251/223;
251/225; 277/111; 277/125
[58] Field of Search .............. 251/214, 215, 221, 223,
251/225; 277/110, 111, 112, 123, 124, 125

[56] References Cited

U.S. PATENT DOCUMENTS

| | | | |
|---|---|---|---|
| 1,988,258 | 1/1935 | Yardley | 251/223 |
| 3,048,362 | 8/1962 | Scarborough | 251/214 |
| 3,559,950 | 2/1971 | Nelson | 251/214 |
| 3,801,112 | 4/1974 | Dumazet | 277/124 |
| 4,486,002 | 12/1984 | Reiss et al. | 277/124 |
| 4,516,752 | 5/1985 | Babbitt et al. | 277/110 |
| 4,572,519 | 2/1986 | Cameron et al. | 277/124 |
| 4,643,440 | 2/1987 | Massey, Jr. | 277/125 |

FOREIGN PATENT DOCUMENTS 729482  3/1966  Canada ................................ 277/125

Primary Examiner—George L. Walton
Attorney, Agent, or Firm—Wolf, Greenfield & Sacks

[57] ABSTRACT

A cryogenic valve having a valve seat in the valve body adapted to be closed by a conical seat disc. The seat disc is supported for vertical movement in a seat holder which is carried by an elongated stem that extends through the valve bonnet. The stem and bonnet are sealed by a series of compressed Teflon and brass rings concentric with and between the upper end of the valve bonnet and the stem. The rings are axially compressed between a flange formed in the valve bonnet and a sleeve follower which in turn is secured by a packing nut. The Teflon rings have holes therethrough and/or roughened surfaces to provide improved sealing.

9 Claims, 2 Drawing Sheets

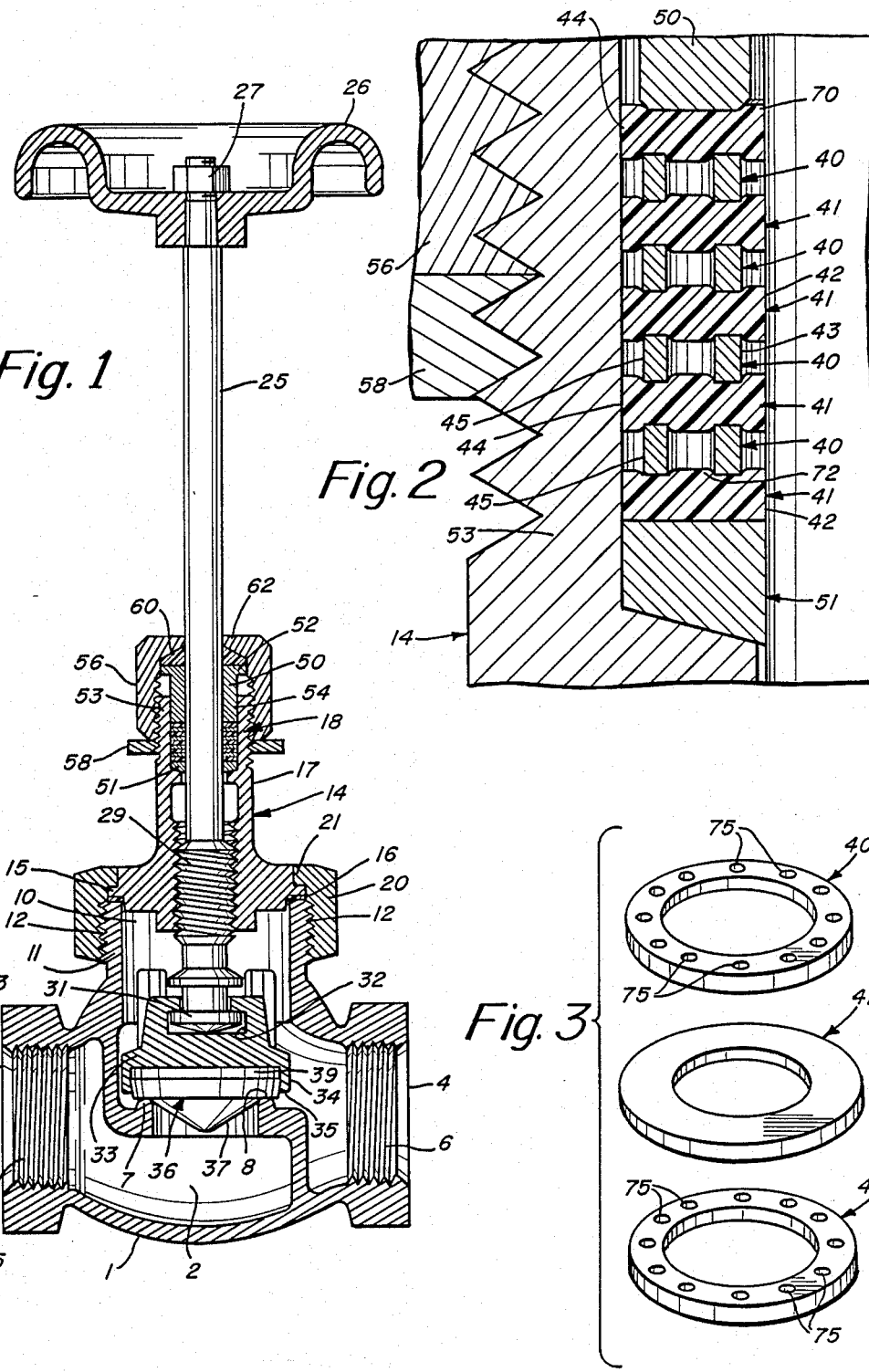

VALVE

BACKGROUND OF THE INVENTION

1. Field of the Invention

The present invention relates in general to a valve and pertains, more particularly, to a globe valve particularly designed for use at cryogenic temperatures.

2. Background Discussion

Valves designed for use at cryogenic temperatures present peculiar problems which are not readily solved by using conventional technology that is suitable for valves used at ambient temperatures. The problems of designing cryogenic valves are substantial because of the special problems presented in operating valves at cryogenic temperatures and because of the peculiar nature of fluids in this temperature range. At cryogenic temperatures, significant problems are introduced in valve design by several factors including substantial shrinkage of the materials involved and by the increased likelihood of leakage through relatively minute openings or gaps. Because of these design problems, cryogenic valves are comparatively expensive and difficult to design for satisfactory operation over a variety of sizes and parameters.

It is therefore an object of the present invention to provide a relatively inexpensive cryogenic valve design that is capable of being embodied in valves of a variety of different sizes that will operate satisfactorily over a wide range of cryogenic temperatures without likelihood of failing.

In connection with the present invention reference is also made to U.S. Pat. No. 3,559,950 for a description of a cryogenic valve.

Another object of the present invention is to provide an improved valve construction, and in particular an improved cryogenic valve construction having an improved sealing construction.

SUMMARY OF THE INVENTION

To accomplish the foregoing and other objects, features and advantages of the invention there is provided a cryogenic valve having a valve body and a bonnet with a passage extending through the body and a valve seat intermediate the ends of the passage. A stem extends through a cylindrical opening in the bonnet and it supports a seat disc holder. A seat disc is supported on the holder for axial movement to and away from engagement with the valve seat. The seat disc is preferably formed with a continuous surface adapted to be engaged within its periphery by the valve seat whereby closure of the seat discover the valve forms a continuous surface adapted to be engaged within its periphery by the valve seat whereby closure of the seat disc over the valve forms a continuous, integral closure. The seat disc holder is provided with depending flanges inwardly flared at their ends and engaging the seat disc at its periphery only so that there is no through opening extending through the surface of the seat disc. The stem is sealed within the body by a plurality of coaxial, alternating metal and plastic rings. There rings are compressed within the cylindrical opening of the bonnet between a packing sleeve follower and means projecting from the cylindrical opening in the bonnet. Preferably, the plastic rings are of greater diameter than the metal rings and are compressed with sufficient force to flow about or extend laterally over the peripheral outer surface of the metal rings thereby effecting a better seal at cryogenic temperatures. The metal rings are provided with spaced circumferential holes therein and/or roughened surfaces so as to enhance sealing characteristics to provide a more integral packing construction and furthermore providing for a minimizing of movement of the rings, particularly the plastic rings when shrinkage occurs due to cold temperatures of operation.

BRIEF DESCRIPTION OF THE DRAWINGS

Numerous other objects, features and advantages of the invention should now become apparent upon a reading of the following detailed description taken in conjunction with the accompanying drawings, in which:

FIG. 1 is a vertical cross-sectional elevation view of a globe valve embodying the principles of the present invention;

FIG. 2 is an enlarged fragmentary view of the packing area of the valve of FIG. 1;

FIG. 3 is an exploded perspective view of the packing rings in accordance with the construction of the present invention;

DETAILED DESCRIPTION

Figure 4:
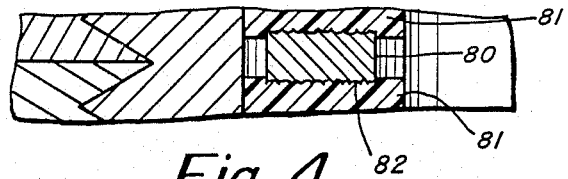
FIG. 4 is a fragmentary view showing an alternate embodiment of the invention employing a roughened surface on the metal ring employed.

Referring to the drawings, there is illustrated a cryogenic globe valve which embodies the present invention. In this arrangement the valve body 1 is formed as an integral unit having a passage 2 extending through it. This passage is formed with open ends 3 and 4. These ends 3 and 4 are parallel with one another and are preferably coaxially aligned. The ends 3 and 4 may be suitably threaded as illustrated at 5 and 6, for interengagement with other cryogenic plumbing. An annular valve seat 7 is formed intermediate the ends of the passage 2, with this valve seat having an upper surface 8, that lies in a plane preferably perpendicular to the plane in which the ends of the passage 2 lie.

The upper end of the body 1 is preferably formed with a relatively wide opening 10 defined by an upper cylindrical wall 11 of the body externally threaded at 12. A bonnet 14 preferably of the same metal material as the body 1, has its lower end positioned within the opening 10. The lower end of the bonnet 14 is formed with an outwardly extending peripheral flange 15 that is adapted to engage the upper surface of the cylindrical wall 11. Preferably an annular gasket 16 of plastic material such for example as Teflon or Kel-F is positioned between the upper surface of the annular wall 11 and the lower periphery of the flange 15. The bonnet 14 is formed with an upwardly extending cylindrical neck 17 that defines a cylindrical opening. The bonnet 14 is secured to the annular wall 11 of the body by a bonnet ring 20 which has an inwardly extending annular flange 21 that engages the upper surface of the flange 15 and has an internally threaded surface that engages the threads 12 formed on the wall 11.

A stem 25 extends vertically through the bonnet 14 into the interior of the body 1. This stem has a conventional ring or handle 26 secured at its upper end by a nut 27. The stem 25 is of substantial length for cryogenic purposes and has approximately one-half its length exposed. The lower end of the stem 25 is threaded as illustrated at 29 with this threaded section 29 threadingly engaging an internally threaded opening extends axially through the bonnet 14. The lower end of the stem 25 is formed with a laterally extending flange 31 which is adapted to loosely engage an inverted T-shaped slot 32 in the valve seat disc holder 33. This valve seat disc holder 33 is formed with a downwardly extending annular peripheral flange 34 that engages the outer periphery of the seat disc 36 outwardly of the valve seat surface 8. The lower extremities 35 of this flange 34 are flared inwardly to firmly engage the undercut periphery of the disc 36.

The disc 36 is preferably formed of a plastic material such as Kel-F or Teflon and has a solid, continuous, conical lower surface 37 that extends outwardly beyond the annular surface 8 of the valve seat 7. The upper end 39 of the disc 36 has a diameter greater than the diameter of the annular surface 8. The periphery of this upper end 39 is undercut or recessed to provide an annular engaging surface for the lower extremities 36 of the annular flange 34. The rolled inwardly flared flange 34 which secures the disc to the lower surface of the disc holder eliminates leakage paths by avoiding studs that extend through the disc. This arrangement also avoids stud breakage which is common in conventional cryogenic valves. The conical surface 37 provides a throttle-like effect between the disc and valve seat and thereby affords an improved closure control for the valve.

Occasionally fluids will collect between the upper surface of disc 36 and the facing surface of the disc holder 33. To avoid damage on temperature cycling a vent means may be provided. This may take the form of a hole extending axially through the holder 33 upwardly from the disc 36 or a groove extending diametrically across the lower surface of the holder and continuously downwardly on the inner surface of flange 34. A groove might also be formed across the top and down the upper end 39 of disc 36.

The plurality of rings illustrated at 18 in FIG. 1, are best illustrated in the enlarged detail of FIG. 2. In this arrangement the rings are formed of alternate metal preferably brass, rings 40 and plastic preferably Teflon, rings 41. The plastic rings 41 have an inner peripheral surface 42 defined on a smaller diameter than the inner peripheral surface 43 of the metal rings 40. The plastic Teflon rings 41 have an outer peripheral surface 44 on a larger diameter than the outer peripheral surface 45 of the brass rings. These rings are maintained under compression by the packing sleeve follower 50 which maintains an axial force in a direction toward the annular brass lower adapter 51. The packing sleeve follower 50 is a cylindrical member having a shoulder section 52 that is adapted to move towards interengagement with the upper end 53 of the neck 17. The packing sleeve follower 50 fits snugly about the surface of the stem 25 and is maintained in compressive relation at its lower end 54 by the packing nut 56 which is coaxial with the stem 25 and packing sleeve follower 50. The nut 56 has an open lower end which is internally threaded and engages complementary threads on the outer surface of the neck 17 at its upper end. If desired, the outer surface of this lower end of the packing nut may have a hexagonal configuration.

A lock nut 58 is tightened against the lower end of the packing nut 56 and fits in snug facing relation with the outer, cylindrical surface of the packing sleeve follower 50. A washer 60 is positioned coaxial with the stem 25 between the upper end 61 of the packing sleeve follower and the inner surface of the upper end 62 of the packing nut. The washer 60 is made of a suitable plastic such as Teflon or Kel-F. Preferably, the upper surface of the packing nut is beveled as illustrated. This washer 60 fits tightly about and acts as a bearing for lateral support of the stem 25. The washer 60 is compressed between the packing nut 56 and the packing sleeve follower 50 to provide a moisture seal in the valve when it operates at relatively low temperatures, or at ambient temperatures.

The rings generally illustrated at 18 are preferably formed by compressing or compacting them by closing the packing sleeve follower 50 and packing nut downwardly towards the bonnet 14 with sufficient force to cause the outer periphery of the Teflon rings 41 to partially flow around or over the peripheral outer surfaces 45 of the metal rings 40. At both ambient and cryogenic temperatures, the outer surfaces 44 of the plastic rings engage the inner surface of neck 17 and the inner surface 42 engages the surface of stem 25. Thus the upper and lower surfaces of the plastic rings are multiplanar with portions of these surfaces engaging the side and peripheral outer surface of the metal rings. It is believed that this overhang, as illustrated at 70, effects a better seal when the valve is operated at cryogenic temperatures. It is theorized that the shrinkage ordinarily associated with these plastic rings at cryogenic temperatures is minimized because the contraction of the plastic is resisted in the projecting portions 70 by the resistance or backing effect of the outer surface of the metal rings.

Furthermore, in accordance with the present invention, to further decrease deformation, in particular of the Teflon rings 42, due to shrinkages at low cryogenic temperatures, the brass rings 40 are provided, in one embodiment, as illustrated in FIGS. 2 and 3, with a series of spaced through holes 75. These holes in one embodiment may be 1/32 inch in diameter relatively evenly spaced about the periphery of the ring 40. These holes may be disposed say over 15°-30° of angle about the periphery of the ring 40. In the embodiment illustrated in FIG. 3, there are a total of twelve holes 75. With such an arrangement there is not only an overhang as illustrated at 70 in FIG. 2 but also an overhang at the area of each of these holes as illustrated at 72 in FIG. 2. These holes also have the effect of enhancing the locking together of the brass and plastic rings.

Figure 5:
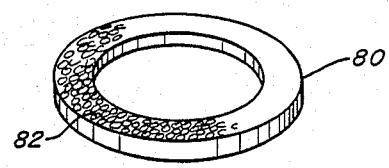
FIG. 5 is a perspective view of the roughened surface metal ring of FIG. 4.

Reference is now made to FIGS. 4 and 5 for an alternate embodiment of the present invention. In this embodiment, the interlocking between the rings 80 and 81 is provided by a roughened surface as illustrated at 82. This roughened surface may be provided by a number of different techniques.

Figure 6:
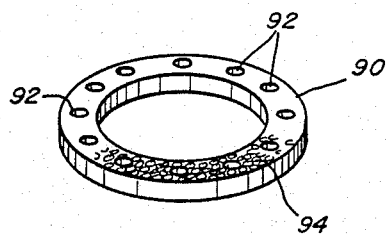
FIG. 6 is still a further embodiment of the present invention employing both through holes in the metal ring as well as a roughened surface for enhancing sealing characteristics and operation at cryogenic temperatures.

Finally, FIG. 6 shows a third embodiment of the present invention in which there is employed a metal washer or ring 90 having both holes as illustrated at 92 and a roughened as illustrated at 94. The alternate embodiments of the invention illustrated in FIGS. 4-6 also provide for an enhancement in interlocking of the rings as well as providing for less deformation upon shrinkage due to cold temperatures.

Figure 7:
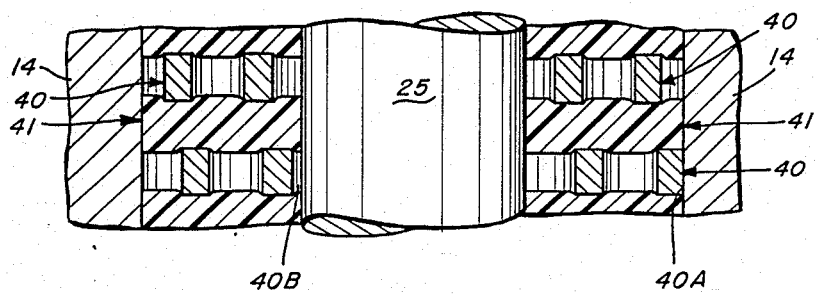
FIG. 7 is a fragmentary view illustrating the significant dimensional considerations regarding, in particular, the sealing rings with their noninterference fit relative to the valve stem.

FIG. 7 is a fragmentary view illustrating the ring 40 and 41 and the manner in which the metal ring 40 is constructed to provide no interference with the stem 5. The inner diameter of the ring is of sufficient size so that should the rings move, such as to the right in FIG. 7, to the point where the ring may virtually touch the body of 48, then there is still clearing at the other side of the ring as illustrated at 40B in FIG. 7 so that there is no direct contact between the metal rings and the stem of the valve.

In summary, there is thus provided herein an improved sealing arrangement particularly for cryogenic applications employing a plurality of coaxial and alternating plastic and metal rings. The metal rings are provided with means defining deformations in the surface thereof to enhance interlocking between the plastic and the metal rings. In a preferred embodiment holes are provided through the rings for providing proper interlocking between the metal and plastic rings. Under compression the plastic fits into the holes or deformation and inhibits, particularly lateral movements, of the plastic. In this connection it is noted that the plastic rings tend to shrink due to cold temperatures of operation. The surface deformations preferably with the use of holes in the metal rings, prevent this deformation and or lateral movement of the sealing plastic rings.

Having now described a limited number of embodiments of the present invention it should be apparent to those skilled in the art that numerous other embodiments and modifications thereof are contemplated as falling within the scope of the present invention as defined by the appended claims.

What is claimed is:

1. A globe valve for use at cryogenic temperatures comprising a valve body having a passage extending therethrough with a valve seat intermediate the ends of the passage, a bonnet having a cylindrical opening secured to said body, an elongated stem extending through said cylindrical opening and supporting at one end a seat disc holder with a seat disc therein within said body for axial movement to and away from said valve seat, a plurality of alternating metal and plastic rings coaxial with said stem and positioned in said cylindrical opening, means for maintaining said plurality of rings under compressive force including means at one end interengaging said bonnet with said plurality of rings and a sleeve follower coaxial with said stem at the other ends, a packing nut coaxial with and engaging said sleeve follower and adjustably interengaged with said bonnet and a washer coaxial with said stem and positioned between corresponding ends of said sleeve follower and said packing nut providing lateral support for said stem and a moisture barrier between said packing nut and stem, said metal rings including at least one of said metal rings having opening means defined on opposite surfaces thereof, whereby, upon movement of said compressive means, said plastic rings engage the opposite respective surfaces and are deformed into said respective opening means to enhance interlocking between the plastic and metal rings.

2. A valve as set forth in claim 1 wherein said means at one end comprises an inwardly flared flange in said cylindrical opening forming a constriction therein, a lower adapter coaxial with said stem having its periphery supported on said inwardly flared flange and engaging one end of said plurality of rings.

3. A valve as set forth in claim 1 wherein said seat disc has a continuous surface adapted to be engaged within its periphery by said valve seat forms a continuous and integral closure over said valve seat, said seat disc holder having depending flanges inwardly flared and engaging said seat disc at its periphery with means interengaging said seat disc holder and said one end of said stem.

4. A valve as set forth in claim 1 wherein said plastic rings have an outer periphery greater than the outer periphery of said metal rings.

5. A valve as set forth in claim 1 wherein said opening means comprises space holes in said rings.

6. A valve as set forth in claim 5 wherein there are provided a plurality of holes disposed about the circumference of the metal ring at intervals in the range of 15°–30°.

7. A valve as set forth in claim 5 wherein said metal rings have a roughened surface for engagement with the plastic rings.

8. A valve as set forth in claim 1 wherein said opening means includes a roughened surface on the metal ring on the surface that contacts the plastic ring.

9. A valve as set forth in claim 1 wherein said metal rings each have an inner diameter greater than the inner diameter of the plastic ring, and wherein the inner diameter of the metal ring in relationship to its outer diameter is selected so that there is a non-interferring fit with the valve stem in the event that the metal ring moves toward contact with the valve body.

* * * * *